Figure 1:
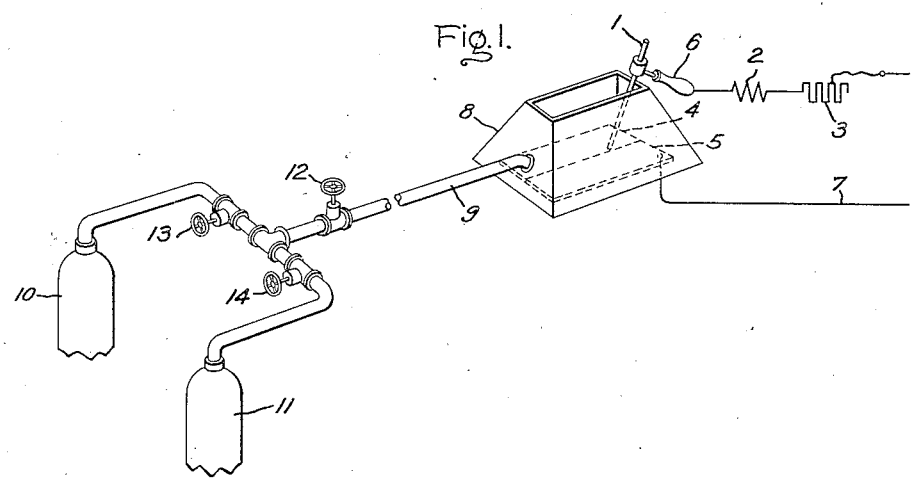

Feb. 4, 1930.   E. THOMSON   1,746,205
ELECTRIC ARC WELDING
Original Filed Aug. 26, 1925

Inventor:
Elihu Thomson,
by Charles E. Tullar
His Attorney.

Patented Feb. 4, 1930

1,746,205

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

ELECTRIC-ARC WELDING

Original application filed August 26, 1925, Serial No. 52,680. Divided and this application filed September 3, 1929. Serial No. 389,892.

My invention relates to electric arc welding and particularly to electric arc welding in gaseous media for the production of sound ductile welds.

It is well known that electric arc welds made in air are characterized by a lack of ductility. This brittleness or lack of ductility has been ascribed to various causes. It seems to be the result of compounds formed when the weld metal is subjected to the extremely high temperature of the electric arc in the presence of certain gases. It has been found, for example, that the weld metal is brittle and easily broken as on bending when it is oxidized or contains nitrides. Welds made in an atmosphere of carbon dioxide or illuminating gas are likewise lacking in ductility.

Perfectly ductile welds may, however, be made in an atmosphere of hydrogen. An example of such welding is disclosed and claimed in the application of Peter P. Alexander, Serial No. 758,082, filed December 26, 1924, for "Methods and apparatus for electric arc welding," assigned to the same assignee as the present application. The welding arc maintained in an atmosphere of substantially pure hydrogen is characterized by an arc voltage which is about twice the arc voltage of that in air, and such welding is also characterized by the fact that a very much higher striking voltage is necessary than is necessary in air to strike and maintain the arc. It has been found that a minimum striking voltage of about 120 volts is necessary in the hydrogen atmosphere. This striking voltage may be obtained by providing a source having a sufficiently high open circuit voltage, or by using a source whose open circuit voltage may be considerably lower than 120 volts provided a sufficiently great amount of reactance is used in the welding circuit. The higher arc voltage is advantageous where a large amount of energy is desired in the arc, as for example, where work of considerable thickness is to be welded. The greater energy results in higher speeds of welding. For many classes of work, however, an arc voltage substantially the same as that in air is sufficient and in accordance with one aspect of my invention welding equipments adapted to produce the voltages required for arc welding in air can be used for producing ductile welds in a gaseous medium. For overhead welding the lower arc voltage is preferable since the metal does not run down so readily.

As described and claimed in my application Serial No. 52,680 for "Electric welding" filed August 26, 1925, and assigned to the same assignee as the present application, which is a division of this earlier filed case, it is possible to produce ductile welds in a gaseous medium composed wholly of carbon monoxide or of a mixture of carbon monoxide and hydrogen. In pure carbon monoxide the arc voltage is slightly below that in air. With the addition of hydrogen it rises gradually and reaches about the same value as that in air for mixtures of approximately 30% hydrogen and 70% carbon monoxide. In accordance with my invention, as disclosed in the present case, the gaseous medium which surrounds the arc and excludes atmospheric air from the arc stream and the molten parts of the work to be welded may be produced by mixing separate gases before they reach the arc or by decomposing a suitable medium at the arc to produce an atmosphere composed preferably substantially of carbon monoxide and hydrogen.

In accordance with the present invention the desired mixture of carbon monoxide and hydrogen is obtained by supplying to the arc carbon dioxide and a sufficient amount of a gas capable of producing with carbon dioxide in the presence of the arc the desired gaseous medium.

While carbon dioxide alone will produce brittle welds, if this gas is used with a sufficient amount of a gas capable of producing with carbon dioxide in the presence of the arc an actively reducing gaseous mixture comprising carbon monoxide and hydrogen ductile welds may be produced. For example, if carbon dioxide is used with a hydrocarbon medium of the proper proportions, a gaseous medium of carbon monoxide and hydrogen may be produced at the arc so as to produce ductile welds, although the hydrocarbon medium alone may be of such a composition as to produce perfectly brittle welds when used alone. As hereinafter described, propane and carbon dioxide may be used to produce ductile welds, although either used alone will produce brittle welds.

It is preferable substantially to eliminate oxygen from the gaseous medium, and it is preferable that the gaseous medium be such that free oxygen does not result from the dissociation of the medium in the arc. When, for example, carbon dioxide alone is used, this is apparently decomposed, where in contact with the core of the arc stream which is of tremendously high temperature, into carbon monoxide and oxygen and the oxygen combines with the metal of the weld resulting in a brittle weld. Nitrogen in the presence of even small amounts of carbon where oxygen is present appears to combine with the weld metal to produce brittle welds. It is, therefore, preferable substantially to exclude nitrogen under such conditions. The gaseous medium may be applied as in the case of hydrogen so as to exclude atmospheric air from the arc stream and the molten parts of the work so as to eliminate the deleterious action of the oxygen and nitrogen of atmospheric air. The gaseous medium supplied to or produced at the arc should be chemically active to reduce oxides present in the work or in the electrode where a metallic electrode is used the metal of which is deposited in the weld, and to counteract the action of any small amount of atmospheric air which may become admixed with the gaseous medium during the welding process.

Figure 2:
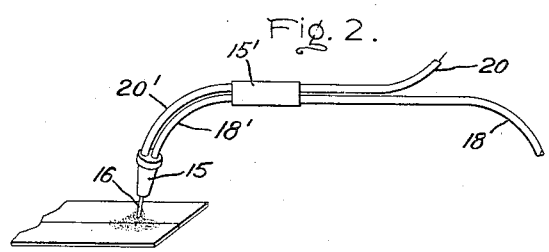

In the drawing, Fig. 1 diagrammatically represents my invention as applied to manual arc welding, and Fig. 2 represents my invention as applied to semi-automatic arc welding.

Fig. 1 shows diagrammatically an arrangement for hand welding in the gaseous atmosphere. The electrode 1, which may be either a metallic or carbon electrode, is indicated as connected to a supply circuit through a reactor 2 and resistor 3. The work is shown as a pair of plates 4 and 5. The electrode is indicated as held by a suitable holder 6 adapted to be manipulated to cause the arc to be established and maintained between the electrode and the work during the welding operation. The lead 7 is shown for connecting the work to the other side of the supply circuit. In order to simplify the drawing, the source is not shown, but it may be a constant potential source where a series stabilizing resistor such as 3 is used. The source however, may be an inherently regulated generator which may supply the arc without the use of a stabilizing resistance. A hood 8 of suitable material, such as asbestos, is shown as covering the work. It may be comparatively small and cover but a portion of the work. The purpose is to exclude atmospheric air from the arc and the molten portion of the work. The hood has an open top which is only sufficiently large to permit the operator to manipulate the electrode readily. During welding, the gases burn for a short distance above the opening in the hood. The gaseous medium is conducted to the hood through the conduit 9 from gas tanks 10 and 11. A valve 12 is provided for controlling the supply of gases to the receptacle 8 and valves 13 and 14 are provided for adjusting the admixture of the gases.

Tank 10 may contain a supply of carbon dioxide and tank 11 another gas which when added in sufficient amounts to the carbon dioxide of tank 10 will produce with that gas in the presence of the arc an actively reducing gaseous mixture comprising carbon monoxide and hydrogen. As previously indicated, a combination of carbon monoxide and hydrogen suitable for welding is produced when a proper mixture of carbon dioxide and a hydrocarbon, such as propane or $C_3H_8$ for example, is subjected to the high temperature of the arc. Under these conditions the propane liberates large amounts of carbon, the carbon dioxide is dissociated by the arc into carbon monoxide and oxygen, and the liberated carbon and oxygen instantly combine to form carbon monoxide if the gases have been mixed in proper proportions. This reaction proceeds in the following steps:

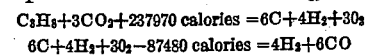

$$C_3H_8 + 3CO_2 + 237970 \text{ calories} = 6C + 4H_2 + 3O_2$$
$$6C + 4H_2 + 3O_2 - 87480 \text{ calories} = 4H_2 + 6CO$$

It will be observed that the final product of this reaction is a mixture comprising 60% of carbon monoxide and 40% of hydrogen. This mixture has substantially the same arc and striking voltages as air and welds produced in its have been found to be strong and ductile. The utilization of carbon dioxide and propane as the raw materials for producing this mixture is advantageous for the reason that these gases are readily available and can be purchased at low cost. These gases are, moreover, non-poisonous.

Fig. 2 shows the application of my invention to a semi-automatic welding apparatus which may be, for example, of the general type disclosed in Letters Patent to P. O. Noble, No. 1,508,711, September 16, 1924. In this type of apparatus, means are provided for automatically feeding the electrode to the work to maintain the arc. Since such means form no essential part of my invention, they have not been shown in the figure. The figure shows an electrode delivery and gas discharge nozzle 15 through which an electrode 16 may be advanced toward the work by suitable means. The nozzle contains or has associated therewith a passageway adapted to be connected with a source of gas or vapor supply through a conduit 18. The conduit leading to the welding tool may be a flexible hose. The part 15' of the tool may be held in the hand of the welder and may be provided with suitable switch contacts for remotely controlling the welding circuit. Examples of such circuit controlling means are well known in the art. The electrode may be guided to the tool through a flexible guide tube 20, which may have the welding lead and control wires incorporated therein or secured thereto. The curved piece 20' may be a small pipe of brass or the like through which the electrode is fed and with which it makes good contact as it is forced around the curve. The part 18' is an extension of the conduit 18 and may be either a small piece of pipe or a piece of flexible hose which may be bound against the pipe 20'.

In view of the disclosure in Fig. 2 of a suitable means for semi-automatic arc welding, it is believed that it is unnecessary to show and describe my invention in a fully automatic welding machine where the electrode is not only automatically fed to compensate for its consumption but automatic means are provided for producing relative movement between the arc and the work along the line of the joint to be welded.

My invention is to be distinguished from work which has been done heretofore, particularly in the incandescent lamp art, where an arc is started and quickly interrupted while the parts are protected from oxidation by a suitable medium. According to this prior art, a brief localized heating effect is utilized to produce a small globule of metal to secure a filament to a supporting wire, for example. The arc is not maintained as in my process, and consequently there is no pool of molten metal in the work which is acted upon or protected by the gaseous atmosphere, but on the contrary the circuit is interrupted as soon as the metal melts sufficiently to form the desired globule.

The application of Irving Langmuir, Serial No. 729,185, filed July 30, 1924, for Heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

The embodiments of the invention illustrated and described herein have been selected for the purpose of clearly setting forth the principles involved. It will be apparent however that the invention is susceptible of being modified to meet different conditions encountered in its use. For example, the dissociation of the carbon dioxide in the presence of a suitable gas such as propane, instead of taking place at the arc, may be occasioned otherwise and the resulting mixture supplied to the arc. I therefore aim to cover by the appended claims all modifications within the true spirit and scope of my invention.

What I claim as new and desire to secure by Letters Patent of the United States is:—

1. The method of electric arc welding which comprises maintaining an arc, producing an actively reducing gaseous mixture comprising carbon monoxide and hydrogen at the arc and about the molten portions of the work by supplying to the arc a gaseous medium comprising carbon dioxide and a gas capable of producing with carbon dioxide in the presence of the air said actively reducing gaseous mixture and conducting the welding operation in said actively reducing gaseous mixture.

2. The method of electric arc welding which comprises maintaining an arc and producing at the arc carbon monoxide and hydrogen by supplying to the arc a gaseous medium comprising a hydrocarbon and a compound of oxygen in proportions to yield carbon monoxide and hydrogen without free oxygen or carbon upon dissociation and recombination at the arc while excluding atmospheric air from the arc and molten portion of the work.

3. The method of electric arc welding which comprises maintaining an arc and supplying to the arc a gaseous medium containing carbon dioxide and propane to produce by the arc a gaseous mixture of carbon monoxide and hydrogen.

4. The method of electric arc welding which comprises maintaining an arc, producing an actively reducing gaseous mixture comprising carbon monoxide and hydrogen by dissociating carbon dioxide in the presence of a gas capable of producing with carbon dioxide said actively reducing gaseous mixture, and surrounding the arc and molten portions of the work with such resulting mixture.

5. The method of electric arc welding which comprises maintaining an arc, dissociating carbon dioxide in the presence of a sufficient quantity of hydrocarbon to neutralize the harmful effect of the liberated oxygen, and welding in a protective envelope of the resulting gaseous mixture.

6. The method of electric arc welding which comprises maintaining an arc and supplying to the arc a gaseous mixture comprising propane and carbon dioxide in which the percentage by volume of carbon dioxide in the mixture does not materially exceed three times that of the propane.

In witness whereof, I have hereunto set my hand this 29th day of August, 1929.

ELIHU THOMSON.